United States Patent [19]

Thompson

[11] 4,367,592

[45] Jan. 11, 1983

[54] GAUGE APPARATUS AND METHOD FOR MEASURING THE DEPTH OF A CIRCUMFERENTIAL GROOVE ON THE INSIDE WALL OF A TUBULAR PART

[75] Inventor: Douglas Thompson, Redmond, Wash.

[73] Assignee: The Boeing Company, Seattle, Wash.

[21] Appl. No.: 220,137

[22] Filed: Dec. 24, 1980

[51] Int. Cl.³ .............................................. G01B 5/12
[52] U.S. Cl. ................................. 33/172 E; 33/178 E
[58] Field of Search ............ 33/178 R, 178 E, 178 F, 33/172 R, 172 E, 147 K, 147 F, 199 R, 174 L

[56] References Cited

U.S. PATENT DOCUMENTS

| | | |
|---|---|---|
| 713,784 | 11/1902 | Mellor . |
| 1,048,073 | 12/1912 | Hirth . |
| 1,257,483 | 2/1918 | Hart et al. . |
| 1,619,834 | 3/1927 | Stein ................................. 33/178 R |
| 1,740,695 | 12/1929 | Johansson . |
| 1,879,398 | 9/1932 | Mirfield . |
| 1,928,457 | 9/1933 | Mershon et al. ............. 33/178 E X |
| 2,312,222 | 2/1943 | Tanner . |
| 2,369,909 | 2/1945 | Mestas ................................ 33/178 E |
| 2,454,246 | 11/1948 | Worthen ....................... 33/147 K X |
| 2,795,049 | 6/1957 | Eisele . |
| 2,832,149 | 4/1958 | Fisk . |
| 2,847,122 | 8/1958 | Zimmermann et al. . |
| 2,938,272 | 5/1960 | Conklin . |
| 3,067,520 | 12/1962 | Geraghty, Jr. . |
| 3,100,349 | 8/1963 | Stresau ............................... 33/178 R |
| 3,225,447 | 12/1965 | Bryant . |
| 3,937,271 | 2/1976 | Akiba et al. . |
| 3,958,337 | 5/1976 | Anichini . |
| 4,045,877 | 9/1977 | Rutter ........................... 33/147 F X |

OTHER PUBLICATIONS

American Machinist, Long Range, Easy Settings Feature, Milco Groove Gage, Mar. 19, 1951.

Primary Examiner—Harry N. Haroian
Attorney, Agent, or Firm—Christensen, O'Connor, Johnson & Kindness

[57] ABSTRACT

In order to check the strength and seal of a fitting that has been swaged on a tubular part, the difference between the nominal inside diameter of the tube and the larger diameter of an inside circumferential groove formed in such tube by swaging of the tube wall radially outwardly into a mating groove of the fitting is measured by a handheld gauge apparatus that includes a probe adapted to be inserted into an open end of the tube adjacent the fitting to perform successive, comparison measurements of the tube's interior wall surface, first at a location axially spaced from the swaged groove, and secondly at the groove. The probe includes a cylindrically shaped probe head of a diameter less than that of the tube's nominal inside diameter so that the probe head can be inserted and cocked at a slight angle relative to the tube axis, and a pivoted arm having a feeler tip disposed in a slotted opening in the probe head and so mounted as to be movable transversely relative to the circumference of the probe head. The feeler tip is displaced to contact the interior wall surface of the tube, initially at a location axially spaced from the groove in order to zero the gauge, and thereafter at the location of the groove to measure its relative depth, while the probe is held so that at both measurement locations the probe head is maintained at the same cocked angle relative to the tube axis.

10 Claims, 6 Drawing Figures

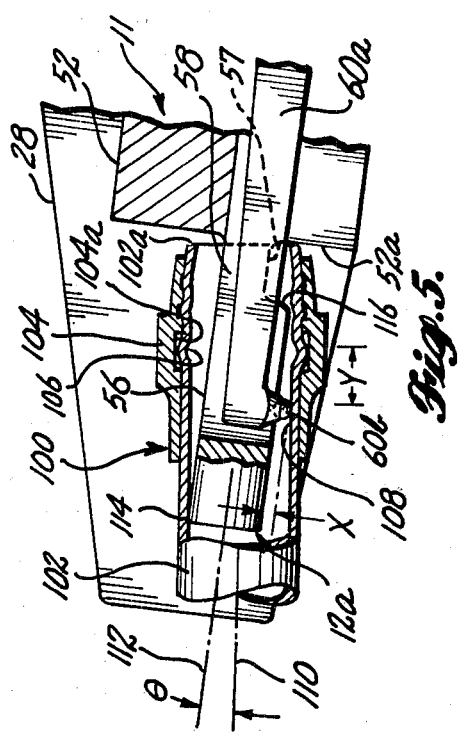
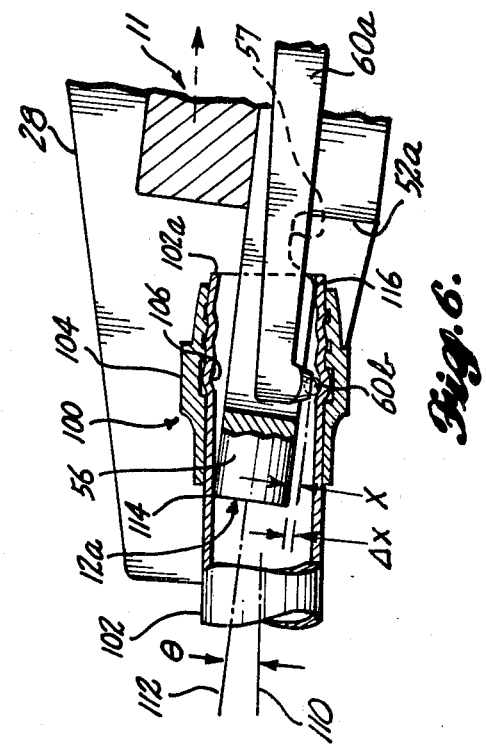
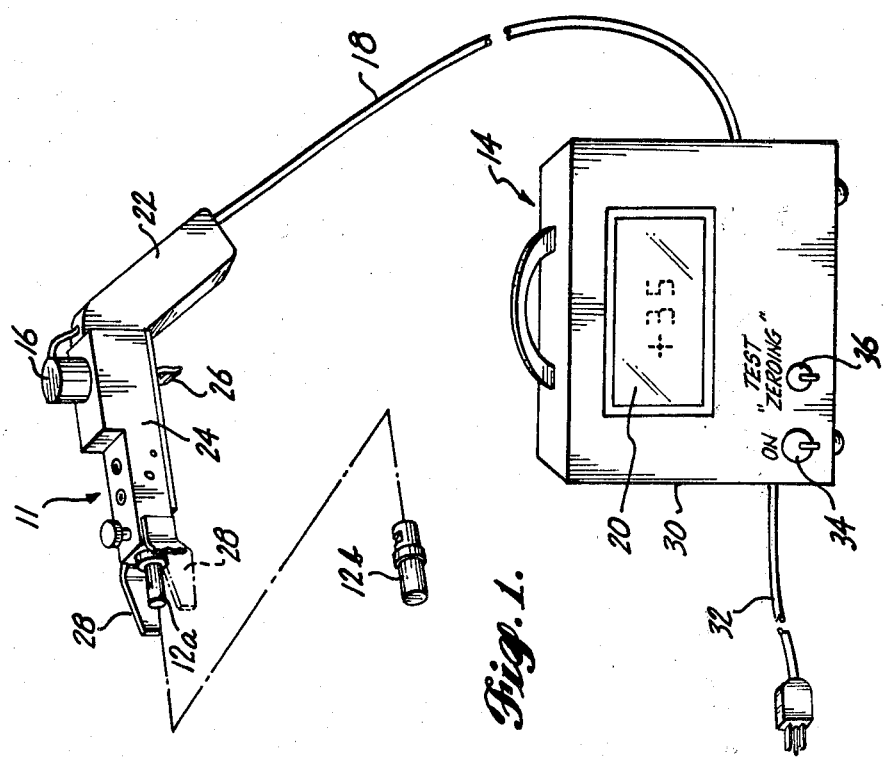

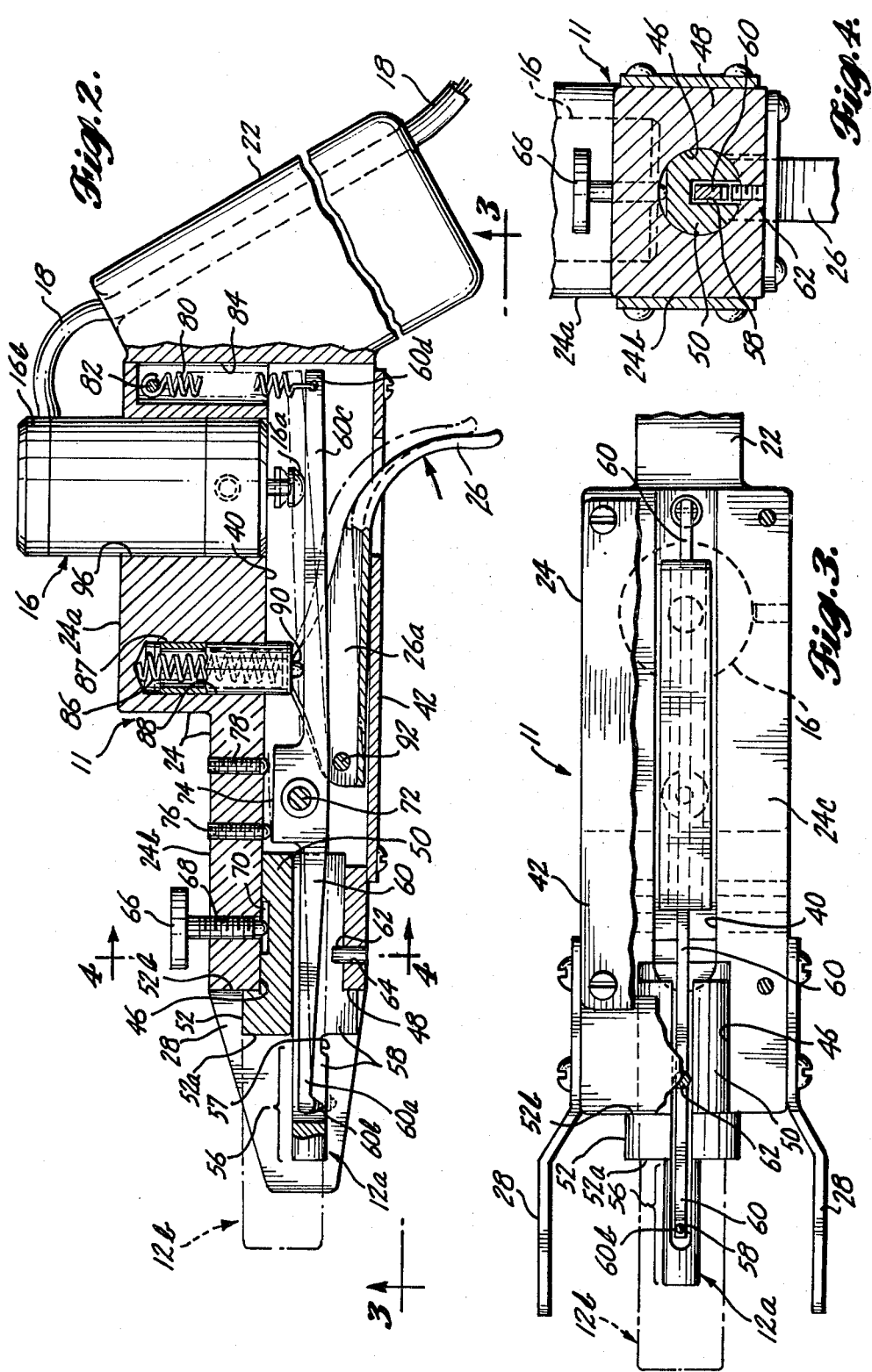

GAUGE APPARATUS AND METHOD FOR MEASURING THE DEPTH OF A CIRCUMFERENTIAL GROOVE ON THE INSIDE WALL OF A TUBULAR PART

BACKGROUND OF THE INVENTION

Generally the invention pertains to measurement apparatus and methods for determining the depth of an interior, circumferential groove formed on a tubular part. For example, such a groove is produced when a certain type of fitting is joined to such a tubular part by swaging the tubular wall outwardly into an inner circumferential recess in the fitting, wherein the depth of the swaged groove is an indication of the integrity of the tube-to-fitting union.

Swaged-on fittings, such as a Harrison fitting are commonly employed to provide a secure mechanical engagement and fluid-tight seal between the outside wall surface of a tubular hydraulic line and one or more circumferential grooves provided on the interior wall of the fitting. The fitting is slipped over an undeformed end of the tube and a swaging tool is inserted into the open tube end to press the tube wall outwardly so that the wall is enlarged into the relieved groove or grooves of the fitting. A preferred mechanical joint and fluid seal is obtained by using a particular type of internally grooved fitting, called a Harrison fitting, which has a series of inner grooves, each being of generally rectangular cross section. In such case and in other similar swaged-on fittings, the effectiveness of the swaging operation in terms of providing a reliable, strong mechanical coupling along with a fluid-tight seal, depends on the extent to which the wall of the tube is deformed into the interior grooves of the fitting. Too much deformation may cause the tube wall to be partially cut by sharp edges of the rectangular cross section groove of the fitting, while too little deformation produces a weak mechanical joint and an unreliable seal.

Quality control analysis has established a correlation between the integrity of the tube-to-fitting union and a quick objective measurement of the depth of the groove formed on the interior wall of the tube relative to the inside diameter of the tube at a predetermined axial distance from the groove (i.e., approximating the nominal inside diameter). Thus, following the swaging operation, the parts are commonly inspected by using a gauge such as an inside caliper to first measure the inside diameter of the tube at a position near the groove, and then measure the inside diameter at the swaged groove, and to reject those parts which show a difference in the measurements that is either too small or too large with respect to predetermined quality control limits.

In the use of conventional gauges for this purpose, it has been found that discrepancies result from the inability of the gauging technique to consistently and accurately measure the degree of deformation associated with the swaging operation. For example, using an inside caliper having a pair of oppositely and outwardly projecting probe points mounted on an elongate probe body that is insertable into an open end of the tube yields inconsistent measurements, because of the required angular alignment of the probe with the axis of the tube to ensure that the feeler points of the caliper are in registration with precisely diametrically opposed points in the groove so as to register its maximum depth. Also, any axial offset of the probe with respect to the centerline of the tube will result in an erroneously smaller diameter reading than the maximum and actual diameter.

For these reasons, it is an object of the invention to provide a novel gauge apparatus and method for measuring the depth of the interior, swaged groove in connection with a swaged-on fitting, relative to a reference surface located inside the tube at a predetermined distance from the groove.

Another object of the invention is to provide a gauge of the above-described nature, which has a configuration that automatically causes the probe portion of the gauge to be centered within the tube so as to avoid any inaccuracies in the measurement caused by inadvertent axial offset relative to the tube's centerline.

Another object of the invention is to provide such a gauge for quality control measurement of the degree of deformation of the radially outwardly swaged wall of the tubular part, wherein the gauge is quickly, reliably and accurately zeroed prior to measuring the depth of the swaged groove.

Still another object is to provide a gauge apparatus and method having in addition to the foregoing capabilities, a construction that is durable so as to provide long troublefree life and an operation that is relatively simple so that the operator need not be highly skilled or undergo substantial training in its use.

SUMMARY OF THE INVENTION

These and other objects, features and advantages of the invention are achieved by a gauge apparatus that is characterized by a probe head having an axis of symmetry and a size suitable for being coaxially inserted into an open end of a tubular part, the interior wall of which is to be measured. Associated with the probe head is a movably mounted probe feeler that is normally retracted into an opening formed in the probe head for that purpose, and is movable transversely therefrom so as to protrude beyond the surrounding exterior of the probe head and contact the interior wall surface of the tubular part. An indicator responds to and registers the degree of relative movement between the feeler and the probe head.

The method of using the gauge apparatus involves first the insertion of the probe head and the feeler in its retracted position, into an open end of a tube that has an interiorly swaged circumferential groove adjacent such open end. After inserting the probe head, its axis of symmetry is cocked so as to be skewed relative to the centerline of the tube forcing a forwardmost edge portion of the head against the interior wall of the tube and at the same time causing a rearward and diametrically opposed edge portion of the head against the interior tube wall at location closer to the tube opening. The skew angle between the thusly cocked axis of the probe head and the centerline of the tube is thereby fixed. The feeler is now moved out of its retracted position and displaced toward the tube wall, transversely of the probe head until the feeler contacts the interior surface of the tube wall at a predetermined axial distance from the groove. This operation zeros (references) the gauge apparatus.

Now the probe head is moved axially in the tube, while maintaining a constant skew angle, to cause the still protruding feeler to ride along the interior wall of the tube until it is in registry with the enlarged inside diameter of the swaged groove. The difference in the transverse movement of the feeler relative to the probe head between the gauge zeroing position spaced from the groove, and the position with feeler in registration with the groove, yields a measurement of the depth of the swaged groove.

In accordance with the preferred embodiment of the invention as disclosed herein, the probe head is substantially cylindrical, with an axially extending slot into which the feeler is retractable, and both the head and feeler are mounted on a handheld support structure that includes a trigger mechanism for operating the feeler movement. The feeler is normally held in a retracted and protected position within the slotted probe head. Upon actuation of the trigger, the feeler is released to be forced out of its retracted position and into contact with the interior tube wall.

Additionally, in the preferred embodiment, the feeler provided by a transversely projecting tip at a forward end of an elongated probe arm that is pivoted intermediate its ends so that the arm tip is movable in a substantially transverse arcuate path into and out of its retracted relationship with the probe head. A mechanical to electrical signal transducer is operatively coupled to the arm movement so as to register the relative feeler to probe head displacement. Also, the preferred embodiment includes laterally spaced guard members mounted on the handheld support so as to project forwardly on opposite sides of the probe head with sufficient spacing therefrom to permit insertion of the probe head into the open end of the tubular part and clearance of the fitting that encircles such part. Another feature of the preferred embodiment is the provision of differently sized, interchangeable probe heads, each of which is removably mounted, one at a time, on the handheld support so as to cooperate with the same probe arm and associated feeler tip.

To provide a complete disclosure of the invention, reference is made to the appended drawings and following description of one particular and preferred embodiment.

BRIEF DESCRIPTION OF THE DRAWINGS

FIG. 1 is an isometric view of the gauge apparatus constructed in accordance with a preferred embodiment of the invention and shown in conjunction with an electrical control and display unit which provides a readout of the gauge measurements.

FIG. 2 is a side, elevational view of the handheld gauge apparatus shown in FIG. 1, in which a portion of the body of the apparatus is shown in vertical and longitudinal cross section.

FIG. 3 is a bottom view of a fragment of the handheld gauge apparatus of FIG. 2, as viewed from a plane indicated by line 3—3 of FIG. 2.

FIG. 4 is a vertical and transverse sectional view of a forwardly projecting body portion of the handheld gauge apparatus, taken along a plane indicated by line 4—4 of FIG. 2.

FIG. 5 is a fragmentary, detail view of the forward, probing end of the handheld gauge apparatus of FIGS. 1-4, shown in use for gauging the depth of a circumferential groove formed on the inside diameter of a tubular part having a swaged-on fitting disposed on the outside circumference of the same tube. FIG. 5 illustrates the probe in an initial position during which the gauge apparatus is zeroed (referenced).

FIG. 6 is a view similar to that of FIG. 5, but showing the probe moved to a different axial position with respect to the tube part and swaged groove for measuring the relative depth of the groove.

DETAILED DESCRIPTION

With reference to FIG. 1, the preferred embodiment of the invention is shown to include a handheld gauge apparatus 11 including a plurality of interchangeable probe heads 12a (shown in its mounted position) and 12b (demounted) of different diameter for use with different sized tubular parts. An associated control and display unit 14 is coupled to a transducer 16 of gauge apparatus 11 via a cable 18 for receiving and registering the measurement results on an electrical signal controlled numeric display 20 mounted on the front control panel of unit 14 as shown.

Apparatus 11, in this preferred embodiment, has a generally pistol-shaped body including a hand grip portion 22, and an elongated support portion 24 that projects (like the barrel of a pistol) forwardly from the upper end of grip portion 22 and terminates at a forwardmost probing end where probe head 12a is removably attached. A trigger 26 cooperates as more fully described herein in combination with a biasing spring and a pivoted probe arm to selectively activate a feeler tip that is movably disposed in a slotted recess within probe head 12a to measure the interior groove of the test part. Transducer 16 converts the mechanical movement of the probe arm into an electrical test signal which is fed over cable 18 to unit 14. A pair of laterally spaced apart guard members 28 are affixed to the support portion 24 of the body of apparatus 11 so as to protrude forwardly on opposite sides of and spaced from the centrally disposed probe head 12a so as to protect the head and the movable probe feeler tip disposed therewithin from damage due to dropping of apparatus 11 or other accidental impact.

Unit 14 is packaged in a portable case 30 that can be transported from one test site to another, and includes a plug-in power cord 32, an on/off switch 34 and a test "zeroing" switch 36, the operation of which will be described hereinafter.

Now with reference to FIG. 2, support portion 24 has a generally rectangular shape in transverse section, and includes rear support portion 24a adjacent grip portion 22 that has substantially greater height than width, and a forward support portion 24b, that has substantially equal height and width, and is separated from the rear portion 24a by a vertical step about mid-length of portion 24. The lowermost surface 24c of support portion 24 is provided with a lengthwise and vertically oriented arm receiving slot 40 that commences at the junction with grip portion 22 and extends forwardly at a uniform height to approximately the mid-point of the forward support portion 24b. Slot 40 opens downwardly and a rectangular shaped cover plate 42 is adapted for being attached by suitable screw fasteners to the lower surface 24c of support portion 24.

The forwardmost end of support portion 24 and more particularly the forward end of portion 24b thereof, is provided with a cylindrical bore 46 having an axis paralleling the lengthwise dimension of support portion 24 and being roughly centered in the end face 48 of forward support portion 24b as shown in FIG. 4.

The body of probe head 12a is formed with a cylindrical shank 50 of a diameter mated to bore 46 into which shank 50 is slidably inserted to install the probe head. An enlarged diameter collar 52 of the head body forms a forwardly facing shoulder 52a and a rearwardly facing shoulder 52b, the latter of which abuts against the face 48 of support portion 24b as shown in FIGS. 2 and 3 to axially position probe head 12a. The head's probe portion 56 itself is cylindrical and coaxial with shank 50 and collar 52 and projects axially forwardly from the shoulder 52a of collar 52 for insertion in the open end of the tubular part that is to be gauged, and a relief 57 is provided adjacent collar 52 so as to extend part way around the lower circumference of portion 56. The diameter of portion 56 of probe head 12a is selected to be just slightly undersized with respect to the nominal inside diameter of the tubular part so that portion 56 can be cocked at a skew angle relative to the tube axis as described more fully hereinafter. Thus, to measure the inside groove on a substantially larger or smaller tubular part, head 12a is interchangeable with a different size probe head, such as head 12b (shown by dotted lines in FIGS. 2 and 3). As depicted, head 12b has a significantly larger diameter at the forwardmost projecting portion corresponding to probe portion 56 of probe head 12a.

With reference to FIGS. 2-4, and as shown for probe head 12a, each of the interchangeable heads is formed with an axially and diametrically (here shown vertically) oriented arm receiving slot 58 which extends rearwardly into communication with the somewhat larger lengthwise and vertically oriented slot 40 formed in support portion 24. Head slot 58 and support portion slot 40 are disposed to accommodate to a center pivoted probe arm 60. The width of slot 58 is just sufficient to accommodate the transverse thickness of a forward extent of arm 60 as best depicted in FIG. 4. An upwardly projecting alignment pin 62 fixed by press fit in a vertically oriented bore 64 in a lower and forward wall of support portion 24b coacts with slot 58 in probe head 12a below the movement of arm 60 to retain probe head 12a and slot 58 in the desired vertical orientation as shown in FIGS. 2 and 4 of the drawings. Once probe head 12a has been inserted and pin 62 adjusted to align slot 58 of the head, a downwardly projecting thumbscrew 66 threaded in a vertically oriented bore 68 in an upper wall of support portion 24b, compressively contacts a flat 70 on shank 50 to secure probe head 12a in place.

Arm 60 is oriented lengthwise with support portion 24, inside slot 40 and is center pivoted on a horizontal and transversely disposed pivot pin 72, the opposite ends of which are secured in sidewalls of forward support portion 24b intermediate the ends of portion 24. Adjacent pin 72, the body of arm 60 is enlarged in the vertical dimension and is formed with a substantially horizontal flat surface indicated at 74 overlying pin 72 that coacts with the downwardly projecting ends of forward and rearward limit setting screws 76 and 78 which limit the pivot angle of arm 60.

A forwardly projecting end 60a of arm 60 is movably received within slot 58 of probe head 12a and is provided at the forwardmost end thereof with a downwardly and transversely projecting feeler tip 60b in the form of a captivated metal ball. Pivoting of arm 60 about pin 72 thus causes feeler tip 60b to be moved between the retracted position (shown by solid lines in FIG. 2) to an activated or gauging position in which tip 60b protrudes transversely and outwardly from the surrounding circumferential surface of probe portion 56 of probe head 12a (as shown in FIGS. 5 and 6). The amount of outward transverse movement of tip 60b is limited by the setting of limit screw 78 and the cooperating flat 74 of arm 60. The rearwardly projecting portion 60c of arm 60 extends within slot 40 and terminates adjacent grip portion 22, where a vertically oriented tension spring 80 is connected between an end 60d of arm 60 and a cross pin 82 fixed adjacent the upper wall of rear support portion 24a in a vertically oriented spring retaining chamber 84. Absent counteracting forces on arm 60, tension spring 80 pulls arm end 60d upwardly so as to force feeler tip 60b downwardly through its maximum travel and maximum protrusion from probe portion 56 of head 12a.

Intermediate pivot pin 72 and the arm's rear end 60d, arm portion 60c is biased by a vertically and downwardly acting compression spring 86 held in a sliding sleeve 87 that is closed at the lower end 90 and open at the top to allow spring 86 to act against support portion 24a. Sleeve 87 reciprocates within a vertically oriented bore 88 in support portion 24a. Spring 86 and the lower end 90 of sleeve 87 thus provides a continuous downward bias on arm portion 60c forcing the forward arm portion 60a to pivot to its retracted position in which it is shown by the solid lines in FIG. 2.

The bias of spring 86 is overcome by operating trigger 26, which, when pulled rearwardly by the operator's finger, rotates an integrally formed, contoured and channel-shaped trigger body 26a, about a transverse pivot pin 92, upwardly against the downward bias of spring 86. By pushing end 90 of spring 86 upwardly, the downward bias on arm portion 60c is relieved, allowing tension spring 80 to force arm end 60a and feeler tip 60b out of the retracted position and into a protruding, part gauging position.

The relative movement of arm 60 and hence the change in position of the feeler tip 60b of the arm is converted into an electrical signal by a position to electrical signal transducer 16 which in the presently disclosed embodiment is a linear voltage differential transformer (LVDT) including a vertically reciprocating slug (not shown) joined to a correspondingly movable plunger 16a that in turn contacts and rides on the upper surface of arm portion 60c at a point intermediate arm end 60d and pivot pin 72. Transducer 16 has a cylindrically shaped case 16b that is fitted into a mating, vertically oriented bore 96 provided in rear support portion 24a so that case 16b can be fixed to support portion 24, allowing plunger 16a to move vertically relative to the support. The LVDT that provides transducer 16 is electrically coupled over leads carried in cable 18 which extend to unit 14 for processing and displaying the transducer output signal in numeric engineering values, in accordance with well known transducer and electrical measurement circuitry.

Operation

With reference to FIGS. 5 and 6, gauge apparatus 11 is used to perform a quality control gauging or measuring operation on a tubular part 100 characterized by a relatively thin wall, open end tube 102 on which a fluid or other type of fitting 104 has been affixed by swaging the wall of tube 102 from the inside out so as to circumferentially and outwardly deform the tubing wall into one or more interior circumferential grooves 104a that are provided on fitting 104. For example, fitting 104 may be a "Harrison" type which when swaged on to tube 102 adjacent an open end 102a thereof forms both a mechanical joint and a fluid-tight seal with the outer wall surface of tube 102. As discussed above, the integrity of this union can be correlated to the depth of a circumferential groove 106 on the interior wall surface of tube 102 where the deformation from the swaging is greatest, measured relative to a reference surface 108 on the inside wall of the same tubular part at a predetermined axial distance Y from groove 106.

For this purpose, apparatus 11 is equipped with a probe head 12a that is selected with a diameter of probe portion 56 smaller than the nominal inside diameter of tube 102. With head 12a mounted as shown in FIG. 2, apparatus 11 is held like a pistol using grip portion 22 and the probe portion 56 of head 12a is inserted as shown in FIG. 5 through the open end 102a of tube 102. During insertion, feeler tip 60b of arm portion 60a remains retracted as shown in FIG. 2 and is only actuated to protrude from portion 56 of probe head 12a after head 12a is inserted sufficiently to cause end 102a of tube 102 to abut against a forwardly facing shoulder 52a of collar 52 of head 12a. The thusly inserted probe head 12a is now cocked relative to the centerline 110 of tube 102 such that as shown in FIG. 5, the axis 112 of the cylindrical head portion 56 of probe head 12a assumes a skewed angle $\theta$ relative to centerline 110. This skew angle $\theta$ is fixed by the forwardmost and rearwardmost diametrically opposed, tangential contact joints 114 and 116 of cylindrical probe portion 56 with the interior wall surface of tube 102. Tangential contact point 114 thus occurs between the forwardmost and as viewed in the drawings upper circumferential edge of head portion 56 and an upper inner wall surface of tube 102. The rearward tangential contact point 116 is between a diametrically opposed and rear, lower circumferential edge of head portion 56 at the forward extent of relief 57 and a lower inner wall surface of tube 102 lying axially between groove 106 and open end 102a. The tangential contact points 114 and 116 fix the skew angle $\theta$ which is critical to accurate gauging of groove 106, and the symmetrical and preferably cylindrical shape of head portion 56 automatically centers the probe to minimize error due to inadvertent axial offset such as would occur if probe portion 56 was shifted laterally so that the movement of arm portion 60a did not lie in a plane passing through the centerline 110 of tube 102. With the axis of probe head 12a and in particular portion 56 thereof cocked at a fixed skew angle $\theta$ in the vertical and axial plane as viewed in FIG. 5, and lying within that plane, trigger 26 is now operated to release arm 60 from the spring bias holding it in its retracted position.

Feeler tip 60b is thereby forced, by the bias of spring 80, transversely and outwardly, in a limited large radius arc so as to protrude from the surrounding circumferential surface of head portion 56. The ball of tip 60b thus moves into contact with the lower wall surface of tube 102 at a location 108 that is at a predetermined axial distance Y from groove 106 on the remote side thereof from opening 102a. This initial measurement references (zeros) the gauge apparatus by establishing the radial distance X (shown in FIG. 5) between the outer surface of the cocked probe head portion 56 and the interior wall surface of tube 102 at a wall location 108 corresponding to the specified axial distance Y inwardly along the interior surface of tube 102 from groove 106. The location 108, being a sufficient distance Y from groove 106, has been established by empirical studies to provide a reliable reference relative to which the groove depth is measured even though the tube wall at location 108 may be somewhat different than the nominal inside diameter of tube 102. By way of example, distance Y is in the present embodiment, between 0.125 to 0.25 inches. The reference value X with respect to which the subsequent depth of groove 106 is measured can either be indicated on display 20 of unit 14 (FIG. 1) and then subtracted from the succeeding measurement of groove 106, or as in this preferred embodiment, the display 20 can be zeroed by operating test switch 36 of unit 14 so that thereafter display 20 will register the value of the increase (i.e., $\Delta X$) by which the succeeding measurement exceeds the reference value X. For this purpose, a conventional signal measurement circuitry may be employed in unit 14 such as used in the LVDT signal conditioning circuit module of an electronics gauge manufactured by Schaevitz Engineer Company, of Camden, New Jersey, modified in a conventional way to be "zeroed" by the test switch 36.

Having either zeroed unit 14 or recorded the reference value X, gauge apparatus 11 is now moved so as to partially withdraw probe portion 56 of head 12a from tube 102, causing probe tip 60b to move from the position shown in FIG. 5 along the lower inside surface of tube 102 until the ball of tip 60b drops down into groove 106. This will correspond to the maximum transverse displacement of tip 60b and hence the maximum reading on display 20 of unit 14. During this axial repositioning of probe portion 56 with respect to tube 102, the skew angle $\theta$ is held constant by maintaining the tangential contact points 114 and 116 with the respective forward and rearward interior surfaces of tube 102. It is observed that the probe tip 60b must register with groove 106 while the rearward and lower tangential contact 116 still resides inside of opening 102a of tube 102 so that skew angle $\theta$ does not vary. For this purpose, the lower partial circumferential relief 57 on probe portion 56 accommodates the continuous tangential contact point 116 as probe portion 56 is moved axially through the distance Y between the positions of FIGS. 5 and 6 without causing a change in the angular skew $\theta$. If display 20 of unit 14 has been zeroed as mentioned above by using test switch 36, then a value representing $\Delta X$ will be indicated on display 20, which in turn represents the depth of swage groove 106 and as discussed above correlates with the integrity of the attached fitting 104 of part 100.

It is noted that the measurement $\Delta X$ of the depth of groove 106 is measured in a transverse plane relative to part 102 that is tilted slightly by the angle $\theta$ relative to a precisely vertical transverse plane. Thus, there is a slight and as a practical matter, negligible, error that occurs in the $\Delta X$ measurement that will increase in accordance with the trigonometric sine function as the skew angle $\theta$ increases. For this reason, it is preferable to select a diameter of probe portion 56 close to the tube's inside diameter so that angle $\theta$ does not exceed 10°. Within this constraint, the degree of error that occurs because of the nature of the angulation of probe portion 56 relative to the test part 100 is negligible insofar as the correlation between the groove depth and the integrity of the fitting union.

Also, it is observed that tube 102 has some additional, and less pronounced circumferential grooves located toward end 102a from the principal groove 106. The depth of these secondary grooves, if present, need not be individually or separately measured and adequate quality control is obtained by gauging the depth of only the principal groove 106.

Calibration of apparatus 11 is effected by using calibrating sleeves for each of the various probe heads 12a and 12b. Such sleeves have a first and relatively smaller inside diameter that slides snugly over the outside diameter of the particular probe head and has a somewhat larger and known inside diameter which is engageable by the probe tip 60b for calibrating the movement of arm 60a and the associated transducer output signal.

While only a particular embodiment has been disclosed herein, it will be readily apparent to persons skilled in the art that numerous changes and modifications can be made thereto including the use of equivalent means and devices, without departing from the spirit of the invention. For example, the disclosed and preferred apparatus 11 employs a mechanical to electrical transducer 16 and an associated signal utilizing unit 14 for providing a digital display of the movement of probe arm 60. Alternatively, the movement of arm 60 could be coupled to a conventional medchanical dial indicator mounted on support 24 of gauge apparatus 11. In such case, the mechanical movement to electrical signal transducer 16 would be eliminated as would be the display and control unit 14.

The embodiments of the invention in which an exclusive property or privilege is claimed are defined as follows:

1. A gauge apparatus for measuring the depth of a circumferential groove on the interior wall of a tubular part, comprising:
   a probe head having an axis of symmetry and defining a forward end adapted for insertion into an open end of a tubular part that has an interior circumferential groove and said probe head defining a rear end, said probe head including a relief portion adjacent said rear end to allow cocking of said probe head at a constant skew angle relative to a centerline of said tubular part as said probe head is moved axially within said tubular part;
   a support structure to which said probe head is mounted adjacent its rear end so that said support structure can be manipulated for inserting the forward end of said probe head into an open end of a tubular part and cocked at said skew angle with an edge on the forward end of said probe head contacting an inside wall surface of such tubular part at a first head-to-wall surface contact location and an edge adjacent said relief portion of said probe head contacting an inside wall surface of such tubular part at a second head-to-wall surface contact location that is rearwardly spaced from the first contact location;
   a probe arm oriented generally parallel to the axis of symmetry of said probe head, said probe arm pivotally mounted on said support structure and having a forward feeler tip end receivably disposed within an opening provided therefor in said probe head, for arcuate movement relative to said probe head so as to be movable between a retracted position recessed within said opening in said head and an operative position protruding transversely from said probe head at a position axially intermediate said forward and rear ends of said probe head so as to contact an interior wall surface of a tubular part into which the probe head has been inserted;
   trigger mechanism means mounted on said support structure for actuating said arm to move said forward feeler tip end between said retracted position and said operative position; and
   indicator means operatively associated with said probe head and probe feeler means for providing an indication of the magnitude of relative movement of said feeler means with respect to said probe head.

2. The gauge apparatus of claim 1 wherein said probe head has a cylindrically shaped body such that circumferential edges on said forward and rear ends of said probe head make axially spaced and diametrically opposed tangential contacts with an inside wall surface of a tubular part into which said probe head has been inserted, at the respectively first and second contact locations.

3. The gauge apparatus of claim 1 wherein said probe arm is mounted on said support structure by pivot means disposed so that said arm pivots in a plane including said axis of symmetry of said probe head.

4. The gauge apparatus of claim 1 wherein said support structure comprises a pistol-shaped body including a grip portion and a barrel-like forwardly projecting support portion, and wherein said mounting means of said probe head is mounted at a forwardmost end of said barrel-like support portion of said pistol-shaped support structure.

5. The gauge apparatus of claim 4, further comprising first biasing means for biasing said probe arm to dispose its feeler tips end in the protruding operative position, and a second biasing means for counteracting said first biasing means to normally hold said feeler tip end of said probe arm in its retracted position, said trigger mechanism means being mounted on said pistol-shaped body of said support structure for selectively overriding said second biasing means to allow displacement of said feeler tip end from said retracted position to said operative position under the urging of said first biasing means.

6. The gauge apparatus of claim 3 wherein said probe head is formed with an axially and radially extending arm receiving slot opening to the circumference of said probe head to define said opening there within for receiving said forward end of said arm and the associated feeler tip.

7. The gauge apparatus of claim 3 wherein said indicator means comprises a position-to-electrical signal transducer responsive to the pivotal movement of said arm.

8. A method of measuring the depth of a circumferential groove on the interior wall of a tubular part, comprising the steps of:
   coaxially inserting a probe head, having an axis of symmetry, into an open end of a tubular part that has a circumferential groove adjacent such open end;
   cocking said probe head at a skew angle relative to the centerline of such tubular part so that forward and rear portions of said probe head contact the inside wall surface of such tubular part at first and second axially spaced and diametrically opposed locations to set a fixed skew angle;
   actuating a probe feeler that is initially retracted within an opening in said probe head so as to cause said probe feeler to be displaced transversely and outwardly with respect to said axis of symmetry of said probe head so that said prove feeler protrudes from a surrounding surface of said probe head and is pressed into contact with an interior wall surface of the tubular part intermediate said first and second axially spaced locations of head-to-wall surface contact; and
   measuring the difference in relative transverse movement of said probe feeler means with respect to said probe head as said probe head feeler means are displaced axially in the tubular part between a position at which the feeler means contacts the inside wall surface at a contact point axially spaced from the groove, and a position at which the feeler means contacts the circumferential groove while maintaining said fixed skew angle.

9. The method of claim 8 wherein said probe head is cylindrical and said forward and rear portions that contact the inside wall surface of the tubular part are circumferential edge portions of said probe head making tangential contact with said wall surface.

10. The method of claim 9, wherein probe head is so selected to have a diameter relative to that of said tubular part so that said fixed skew angle is not greater than 10 degrees.

* * * * *